(12) United States Patent
Krauthamer (10) Patent No.: US 11,675,213 B2
(45) Date of Patent: *Jun. 13, 2023

(54) SYSTEMS AND METHODS FOR PROJECTING IMAGES FROM LIGHT FIELD DISPLAYS BASED ON REFLECTED LIGHT RAYS

(71) Applicant: Universal City Studios LLC, Universal City, CA (US)

(72) Inventor: Akiva Meir Krauthamer, Ocoee, FL (US)

(73) Assignee: Universal City Studios LLC, Universal City, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/505,285

(22) Filed: Oct. 19, 2021

(65) Prior Publication Data

US 2023/0118266 A1     Apr. 20, 2023

(51) Int. Cl.
  *G02B 30/33* (2020.01)
  *G06T 7/70* (2017.01)
  *H04N 13/302* (2018.01)
  *G02B 30/27* (2020.01)

(52) U.S. Cl.
  CPC ........... *G02B 30/33* (2020.01); *G02B 30/27* (2020.01); *G06T 7/70* (2017.01); *H04N 13/302* (2018.05)

(58) Field of Classification Search
  CPC .......... G02B 30/33; H04N 13/30; G06T 7/70
  See application file for complete search history.

(56) References Cited

U.S. PATENT DOCUMENTS

| | | | |
|---|---|---|---|
| 7,500,758 B1 * | 3/2009 | Adachi | G03B 17/54 349/5 |
| 9,858,719 B2 * | 1/2018 | Dorner | G06T 7/70 |
| 11,138,801 B2 | 10/2021 | Krauthamer | |
| 2019/0015747 A1 | 1/2019 | Thompson et al. | |
| 2019/0392640 A1 * | 12/2019 | Qian | G06K 19/06037 |
| 2021/0134033 A1 * | 5/2021 | Anttila | G06F 3/167 |

FOREIGN PATENT DOCUMENTS

WO     2021165798 A1    8/2021

OTHER PUBLICATIONS

Kaminokado, Takumi et al.; "Augmented Environment Mapping for Appearance Editing of Glossy Surfaces," 2019 IEEE International Symposium on Mixed and Augmented Reality (ISMAR), Oct. 2019, pp. 55-65.
PCT/US2022/046918 International Search Report and Written Opinion dated Jan. 31, 2023.

* cited by examiner

*Primary Examiner* — Jayanti K Patel
*Assistant Examiner* — Christopher Kingsbury Glover
(74) *Attorney, Agent, or Firm* — Fletcher Yoder P.C.

(57) ABSTRACT

Systems and methods presented herein include light field displays configured to display primary autostereoscopic images and to simultaneously project (e.g., in real time, while displaying their own primary autostereoscopic images) light rays toward display devices (e.g., either reflective devices or cameras) to display secondary autostereoscopic images via the display devices. The light rays projected from the light field displays are controlled by a control system based at least in part on positional data (e.g., position, orientation, and/or movement) of the display devices, which may be determined by the control system based at least in part on detection of light rays that are reflected off the display devices.

20 Claims, 11 Drawing Sheets

SYSTEMS AND METHODS FOR PROJECTING IMAGES FROM LIGHT FIELD DISPLAYS BASED ON REFLECTED LIGHT RAYS

BACKGROUND

The present disclosure relates generally to amusement park special effects and, more specifically, to the use of light field displays to generate amusement park special effects.

In an amusement park environment, it may be desirable to provide special effects (e.g., visual effects) that generate feelings of excitement, awe, and curiosity in guests. Specifically, for example, it is desirable to create illusions that are counter to what people traditionally experience in everyday life. Such illusions can be used to generate excitement and provide immersive experiences in a themed environment. Technology can be used to provide such special effects. Accordingly, it is now recognized the improved special effects techniques and technology, as described herein, are desirable for improving entertainment experiences.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a light field display system includes one or more light field displays configured to display primary autostereoscopic images and to project light rays toward one or more display devices to display secondary autostereoscopic images via the one or more display devices. The light field display system also includes one or more cameras configured to detect light rays reflected off the one or more display devices. The light field display system further includes a control system configured to determine a position, orientation, and/or movement of the one or more display devices in a physical environment based at least in part on the light rays detected by the one or more cameras; to calculate respective light field vector functions for the light rays projected by the one or more light field displays toward the one or more display devices based at least in part on the determined position, orientation, and/or movement of the one or more display devices in the physical environment; and to cause the one or more light field displays to project subsequent light rays toward the one or more display devices in accordance with the respective calculated light field vector functions to display subsequent secondary autostereoscopic images via the one or more display devices.

In an embodiment, a method includes displaying, via one or more light field displays, primary autostereoscopic images. The method also includes detecting, via one or more cameras, light rays reflected off one or more display devices. The method further includes determining, via a control system, a position, orientation, and/or movement of one or more display devices in a physical environment based at least in part on the light rays detected by the one or more cameras. In addition, the method includes calculating, via the control system, respective light field vector functions for light rays projected by the one or more light field displays toward the one or more display devices based at least in part on the determined position, orientation, and/or movement of the one or more display devices in the physical environment. The method also includes causing, via the control system, the one or more light field displays to project subsequent light rays toward the one or more display devices in accordance with the respective calculated light field vector functions to display subsequent secondary autostereoscopic images via the one or more display devices.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to systems and methods for projecting images from light field displays based at least in part on positional tracking data (e.g., position, orientation, and/or movement) of display devices toward which light rays from the light field displays are projected and/or of humans associated with (e.g., holding) the display devices. This technology can be used to create special effects by which an image is seen in a mirror but not in the physical environment. For example, this effect may make an amusement park guest feel as though they are using a magical object. The magical nature of this effect will be greatly increased if the amusement park guest is able to hold the mirror in their hands rather than having the mirror mounted in a stationary position. For this effect to be most successful, it must look correct for many amusement park guests at the same time.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As used herein, the terms "real time" and substantially real time" refer to actions that are performed substantially simultaneously with other actions, without any human-perceptible delay between the actions. For example, two functions performed in substantially real time occur within seconds (or even within milliseconds) of each other. As but one non-limiting example, two functions performed in substantially real time occur within 1 second, within 0.1 second, within 0.01 second, and so forth, of each other.

Embodiments of the present disclosure enable systems and methods for projecting images from light field displays based at least in part on positional tracking data (e.g., position, orientation, and/or movement) of display devices toward which light rays from the light field displays are projected and/or of humans associated with (e.g., holding) the display devices. Specifically, the light field displays described herein are configured to display primary autostereoscopic images and to simultaneously project (e.g., in real time, while displaying their own primary autostereoscopic images) light rays toward the display devices (e.g., either reflective devices or cameras) to display the secondary autostereoscopic images via the display devices. As described in greater detail herein, the light rays projected from the light field displays are controlled by a control system based at least in part on the positional tracking data (e.g., position, orientation, and/or movement) of the display devices and/or of a portion of the humans (e.g., of the human himself, or of a particular person of the human, such as an eye of the human for eye tracking, a head of the human for head tracking, and so forth), which may be detected via sensors of the display devices and/or via cameras disposed about a physical environment within which the display devices and the humans are located. Specifically, the control system calculates light field vector functions for light rays to be projected toward each individual display device based at least in part on positional tracking data for that particular display device and/or its associated human.

In addition, although described primarily herein as displaying primary autostereoscopic images and simultaneously projecting light rays toward display devices to display secondary autostereoscopic images via the display devices, in other embodiments, the light field displays may instead display primary non-autostereoscopic images and/or project light rays toward the display devices to display secondary non-autostereoscopic images via the display devices. For example, in such embodiments, the light field displays may still be capable of displaying different images in different directions than the display devices, but the angular density of those images could be lower than needed for autostereoscopic images, as described in greater detail herein.

Figure 1:
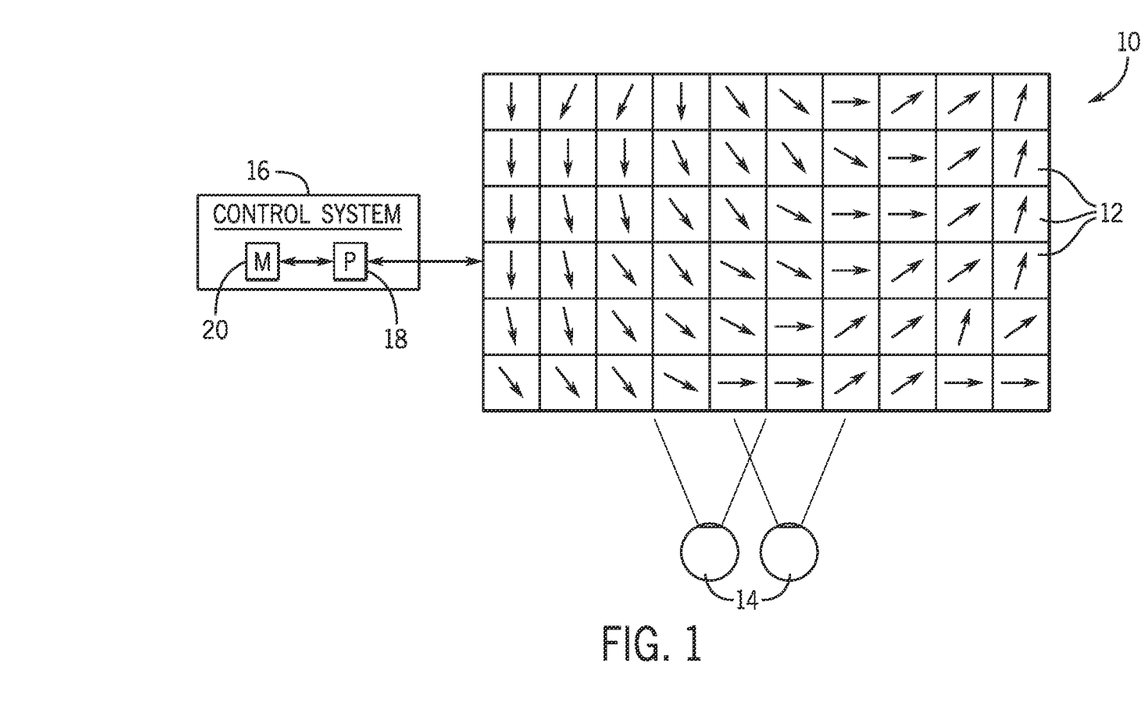
FIG. 1 is a schematic diagram of a light field display configured to generate autostereoscopic images that display objects that appear to be three-dimensional, in accordance with an embodiment of the present disclosure.

FIG. 1 is a schematic diagram of a light field display 10 configured to generate autostereoscopic images that display objects that appear to be three-dimensional. Although primarily described herein as being applicable to amusement park attractions, it will be appreciated that the light field display systems described herein may be extended to other applications that may benefit from the generation of autostereoscopic images. In addition, although primarily described herein as being a single light field display 10, in other embodiments, a plurality of light field displays 10 may be used in conjunction with each other to perform the light projection described herein.

As illustrated in FIG. 1, the light field display 10 may include a plurality of pixels 12, wherein light emanating from each individual pixel 12 has individual three-dimensional directionality. In particular, in certain embodiments, each individual pixel 12 may be configured to display any number of images depending on the position of an amusement park guest's eyes 14 viewing the autostereoscopic images displayed by the light field display 10. For example, in certain embodiments, each individual pixel 12 may be configured to display hundreds, thousands, or even more different combinations of light and color depending on the position of an amusement park guest's eyes 14 viewing that particular pixel 12. It will be appreciated that the number of pixels 12 displayed as part of the light field display 10 are merely illustrative and that, in actual implementations, the light field display 10 may include millions of pixels 12, or even more pixels 12.

As such, in certain embodiments, a control system 16 may be configured to calculate the light field (e.g., vector function) that determines how the pixels 12 will emanate light rays to generate the autostereoscopic images displayed by the light field display 10. Since each individual pixel 12 generates light rays having individual three-dimensional directionality, the vector function calculated by the control system 16 may include five-dimensional space (e.g., three-dimensional space of the individual pixels 12 coupled with three-dimensional directionality) as well as color and radiance of the light rays themselves.

In certain embodiments, the control system 16 may include processing circuitry, such as a processor 18 (e.g., general purpose processor or other processor) and a memory 20, wherein the processor 18 may execute computer-executable instructions stored in the memory 20 that, when executed by the processor 18, cause the processor 18 to calculate the light field vector function, and then to send control signals to the individual pixels 12 of the light field display 10 to create the light rays that form the light field displayed by the light field display 10. The computer-executable instructions to perform these functions may be encoded in programs or code stored in tangible non-transitory computer-readable media, such as the memory 20 and/or other storage. In certain embodiments, the processor 18 may be a general-purpose processor, system-on-chip (SoC) device, an application-specific integrated circuit (ASIC), or some other similar processor configuration. In certain embodiments, the processor 18 may include more than one processor.

Figure 2:
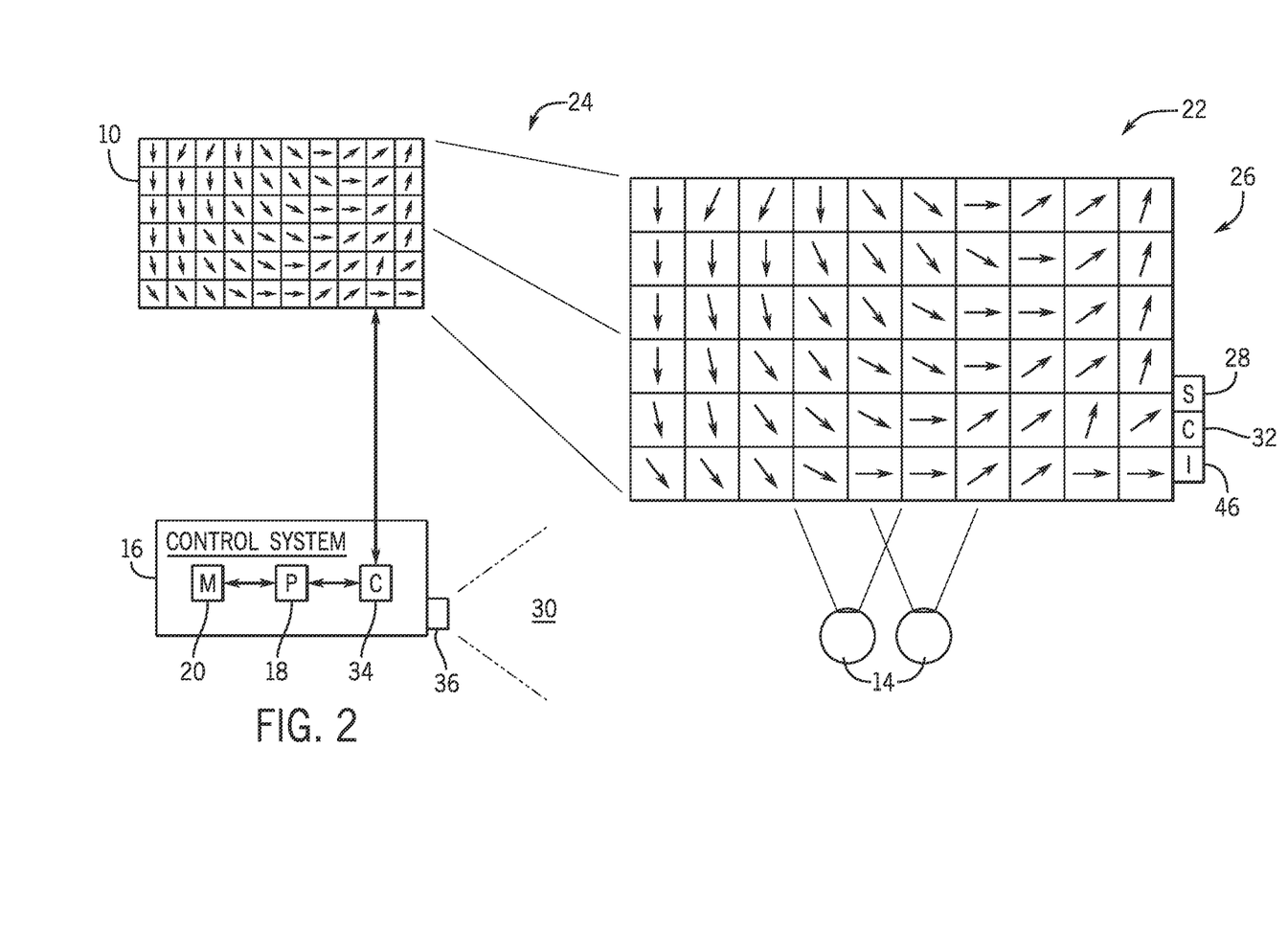
FIG. 2 illustrates a reflective light field display system in which the light field display of FIG. 1 not only generates autostereoscopic images on the light field display, but also simultaneously projects light rays that, when reflected off one or more reflective devices, generate autostereoscopic images on the reflective devices, in accordance with an embodiment of the present disclosure.

As described above, the images generated by the light field display 10 are autostereoscopic. As such, no head-mounted displays are needed to view the images generated by the light field display 10. However, the embodiment illustrated in FIG. 1 is only one way in which autostereoscopic images may be generated. For example, FIG. 2 illustrates a reflective light field display system 22 in which the light field display 10 of FIG. 1 not only generates primary autostereoscopic images on the light field display 10, but also simultaneously projects (e.g., in real time, while displaying the autostereoscopic images) light rays 24 that, when reflected off one or more reflective devices 26 (i.e., display devices, such as mirrors, glossy surfaces, mobile device screens, and so forth), generate secondary autostereoscopic images on the reflective devices 26, which may be entirely different from the primary autostereoscopic images generated by the light field display 10. As such, in addition to the control system 16 directly controlling pixels 12 of the light field display 10, the control system 16 illustrated in FIG. 2 is also configured to simultaneously control (e.g., in real time, while controlling the light field display 10 to display its own primary autostereoscopic images) the light rays 24 projected from the light field display 10, which may be reflected off the reflective devices 26 to generate secondary autostereoscopic images on the reflective devices 26. In certain embodiments, each of the reflective devices 26 may consist essentially of only a mirror with a protective cover disposed on a non-reflective side of the mirror. Indeed, in certain embodiments, the reflective devices 26 do not include any active display elements, but rather use only a mirror to reflect light rays 24 generated by the light field display 10.

As described above, although described primarily herein as displaying primary autostereoscopic images and simultaneously projecting light rays 24 toward reflective devices 26 to display secondary autostereoscopic images via the reflective devices 26, in other embodiments, the light field display 10 may instead display primary non-autostereoscopic images and/or project light rays toward the reflective devices 26 to display secondary non-autostereoscopic images via the reflective devices 26. For example, in such embodiments, the light field display 10 may still be capable of displaying different images in different directions than the reflective devices 26, but the angular density of those images could be lower than needed for autostereoscopic images, as described in greater detail herein.

It will be appreciated that, in order to calculate the light field vector function that determines the light rays 24 that should be projected from the light field display 10 for any particular reflective device 26, the control system 16 will need to know at least the position, orientation, and/or movement of the particular reflective device 26. As such, in certain embodiments, each reflective device 26 may include one or more position/orientation sensors 28 (e.g., accelerometers, magnetometers, gyroscopes, Global Positioning System (GPS) receivers, motion tracking sensors such as electromagnetic and solid-state motion tracking sensors, and so forth) configured to detect a position, orientation, and/or movement of the reflective device 26 relative to a physical environment 30 within which the reflective device 26 is located, and for which the light field display 10 generates light rays 24. In addition, in certain embodiments, each reflective device 26 may include communication circuitry 32 configured to facilitate communication of data relating to a position, orientation, and/or movement of the reflective device 26 relative to the physical environment 30. Specifically, such data may be communicated to the control system 16 via communication circuitry 34 of the control system 16. As such, the control system 16 may utilize the data relating to a position, orientation, and/or movement of the particular reflective device 26 relative to the physical environment 30 to automatically calculate the light field vector function that determines the light rays 24 that should be projected from the light field display 10 for the particular reflective device 26. This calculation may be done in substantially real time with respect to the detection of the position, orientation, and/or movement of the reflective device 26 relative to the physical environment 30.

In addition, in certain embodiments, the control system 16 may itself be configured to detect a position, orientation, and/or movement of the reflective device 26 and/or of an amusement park guest holding the reflective device 26 relative to a physical environment 30 within which the reflective device 26 and the amusement park guest holding the reflective device 26 are located. The control system 16 may utilize data relating to the detected position, orientation, and/or movement of the reflective device 26 and/or of the amusement park guest holding the reflective device 26 relative to the physical environment 30 to automatically calculate the light field vector function that determines the light rays 24 that should be projected from the light field display 10 for the particular reflective device 26. This automatic calculation by the control system 16 may be done in substantially real time with respect to the detection of the position, orientation, and/or movement of the reflective device 26 and/or of the amusement park guest holding the reflective device 26 relative to the physical environment 30. For example, in certain embodiments, one or more cameras 36 associated with the control system 16 may be configured to capture images and/or video of the physical environment 30, and the control system 16 may be configured to analyze the captured images and/or video of the physical environment 30 to identify the reflective device 26 and/or the amusement park guest holding the reflective device 26 for the purpose of tracking a position, orientation, and/or movement of the reflective device 26 and/or of the amusement park guest holding the reflective device 26 relative to the physical environment 30. In particular, the position, orientation, and/or movement of the reflective device 26 relative to eyes 14 of the amusement park guest holding the reflective device 26 (e.g., via head-tracking and/or eye-tracking algorithms executed by the control system 16 with respect to the images and/or video captured by the one or more cameras 36) is a parameter for calculating an appropriate light field vector function to project the light rays 24 for the particular reflective device 26.

In certain embodiments, the processor 18 of the control system 16 may execute computer-executable instructions stored in the memory 20 of the control system 16 that, when executed by the processor 18, cause the processor 18 to receive data relating to a position, orientation, and/or movement of the reflective device 26 and/or of the amusement park guest holding the reflective device 26 relative to the physical environment 30 from the one or more position/orientation sensors 28 of the reflective device 26 and/or from the one or more cameras 36, to analyze the data to automatically calculate the light field vector function that determines the light rays 24 that should be projected from the light field display 10 for the particular reflective device 26 in substantially real time with respect to the detection of the position, orientation, and/or movement of the reflective device 26 and/or of the amusement park guest holding the reflective device 26 relative to the physical environment 30, and then to automatically send control signals to the light field display 10 to project the light rays 24 in accordance with the calculated light field vector function such that autostereoscopic images are viewable on the particular reflective device 26 from the perspective of the amusement park guest holding the reflective device 26 in substantially real time with respect to the calculation of the light field vector function.

As such, in certain embodiments, the control system 16 may utilize a combination of data relating to a position, orientation, and/or movement of a particular reflective device 26 based on feedback from one or more position/orientation sensors 28 of the particular reflective device 26 and/or data relating to a position, orientation, and/or movement of the particular reflective device 26 and/or of the amusement park guest holding the particular reflective device 26 based on feedback from one or more cameras 36 of the control system 16 to determine how to calculate the light field vector function that determines the light rays 24 that should be projected from the light field display 10 for the particular reflective device 26. As such, the one or more position/orientation sensors 28 of the reflective devices 26 and/or the one or more cameras 36 of the control system 16 described herein may function collectively as a three-dimensional tracking system for tracking position, orientation, and/or movement of the reflective devices 26 and/or of the amusement park guests holding the reflective devices 26 for the purpose of determining the light rays 24 that should be projected from the light field display 10 for the reflective devices 26.

In certain embodiments, the light field vector function calculated by the control system 16 causes the light field display 10 to output only light rays 24 that are intended to be viewed by the eyes 14 of the particular amusement park guest holding the particular reflective device 26, but may, for example, show black (e.g., an absence of visible light) from other positions from which the reflective device 26 is viewed. As such, the autostereoscopic images reflected off the particular reflective device 26 may be directed to the eyes 14 of the particular amusement park guest holding the particular reflective device 26, whereas the reflective device 26 may, for example, look like a surface void of additional imagery provided by the light rays 24 (e.g., a black surface, in certain instances) when viewed by other amusement park guests from other perspectives. Alternatively, in certain situations, the autostereoscopic images reflected off the particular reflective device 26 may be directed to the eyes 14 of the particular amusement park guest holding the particular reflective device 26, whereas the reflective device 26 may reflect other images when viewed by other amusement park guests from other perspectives. In other words, different perspectives from different locations relative to a particular reflective device 26 may reflect entirely different images (or, no additional images provided by the light rays 24). It will be appreciated that the ability of the light field display 10 to only project light rays 24 to eyes 14 of a particular amusement park guest holding a particular reflective device 26 enables the light field display 10 to project the autostereoscopic images displayed via the reflective devices 26 from being recorded by amusement park guests in an unauthorized manner.

Figure 3:
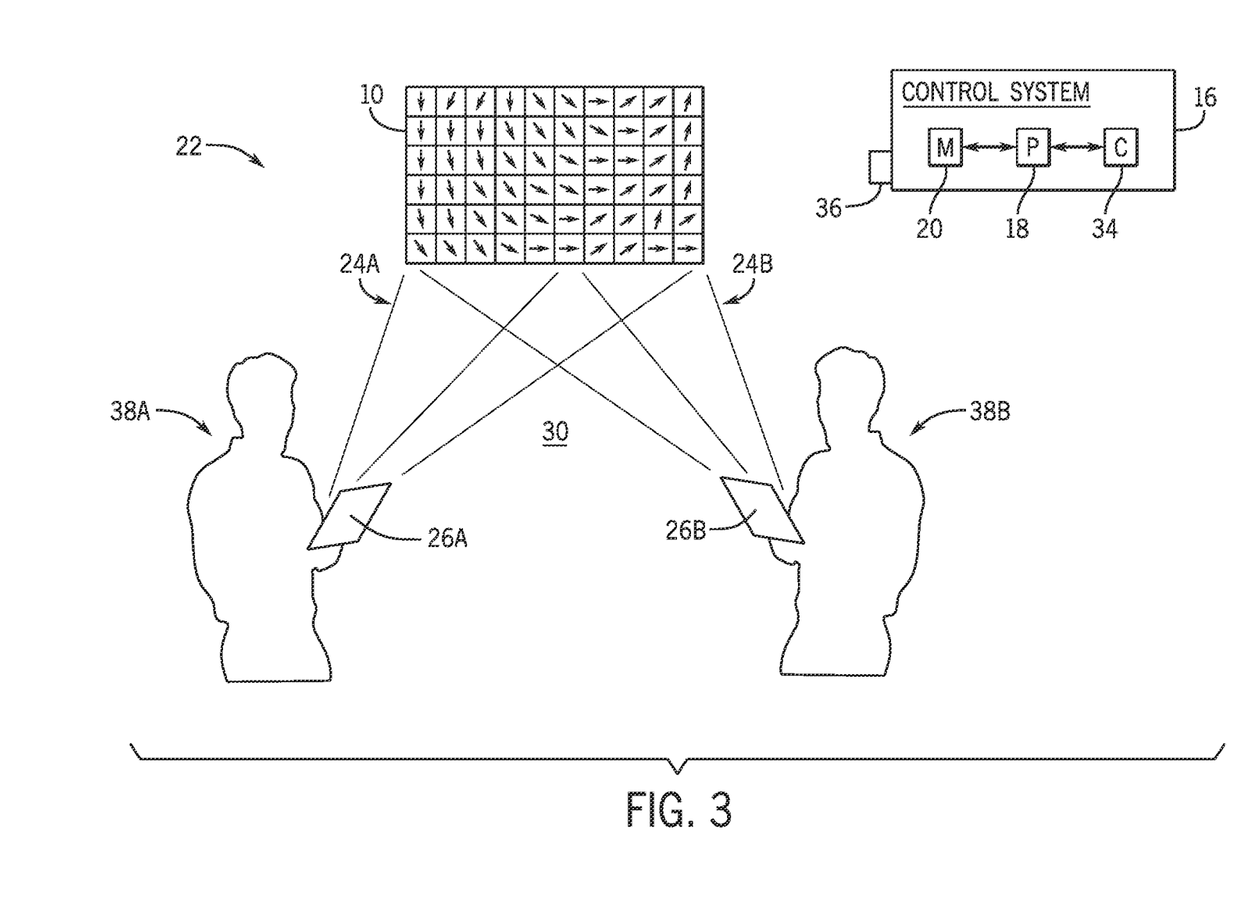
FIG. 3 illustrates a reflective light field display system in which the light field display of FIG. 1 projects light rays to a plurality of respective reflective devices being held by a plurality of respective amusement park guests, in accordance with an embodiment of the present disclosure.

The embodiment illustrated in FIG. 2 includes only one reflective device 26 being used. However, in other embodiments, the light field display 10 may be used to project light rays 24 to multiple reflective devices 26 in a particular physical environment 30. FIG. 3 illustrates a reflective light field display system 22 in which the light field display 10 of FIG. 1 projects light rays 24A, 24B to a plurality of respective reflective devices 26A, 26B being held by a plurality of respective amusement park guests 38A, 38B in a particular physical environment 30. Although illustrated in FIG. 3 as only including two reflective devices 26A, 26B being held by two respective amusement park guests 38A, 38B, it will be appreciated that any number of reflective devices 26 being held by respective amusement park guests 38 may be used in a particular physical environment 30.

In embodiments such as those illustrated in FIG. 3, the control system 16 is configured to distinguish certain amusement park guests 38A from other amusement park guests 38B and to distinguish certain reflective devices 26A from other reflective devices 26B so that the light field display 10 can project light rays 24A, 24B to appropriate reflective devices 26A, 26B in the appropriate manner, as described above with respect to FIG. 2. In certain embodiments, the control system 16 may be configured to identify (e.g., by analyzing images and/or video of the physical environment 30 captured by one or more cameras 36, as described in greater detail herein) certain amusement park guests 38A, 38B based at least in part on facial recognition techniques, clothing recognition techniques, movement recognition techniques (e.g., to detect identifiable gaits of particular amusement park guests 38A, 38B), and/or other guest recognition techniques (e.g., via guest recognition algorithms executed by the control system 16 with respect to images and/or video captured by one or more cameras 36 of the control system 16), and/or to identify certain reflective devices 26A, 26B based at least in part on geometric aspects or markings that are present on the reflective devices 26A, 26B (e.g., via reflective device recognition algorithms executed by the control system 16 with respect to images and/or video captured by one or more cameras 36 of the control system 16).

In certain embodiments where the light field display 10 projects light rays 24 to a plurality of respective reflective devices 26 being held by a plurality of respective amusement park guests 38, the light field display 10 may be configured to project the same autostereoscopic images to every amusement park guest 38 via every reflective device 26 in certain situations. Alternatively, in other situations, the light field display 10 may only project an autostereoscopic image to one, or a selected subset, of the amusement park guests 38 via their respective reflective devices 26. In certain embodiments, only certain amusement park guests 38 may be able to view autostereoscopic images via their respective reflective devices 26 based on data about the particular amusement park guests 38. For example, in certain embodiments, the control system 16 may keep track of which amusement park guests 38 are members of certain teams in a game, and may instruct the light field display 10 to only project autostereoscopic images to reflective devices 26 of amusement park guests 38 that are on a particular team.

Figure 4:
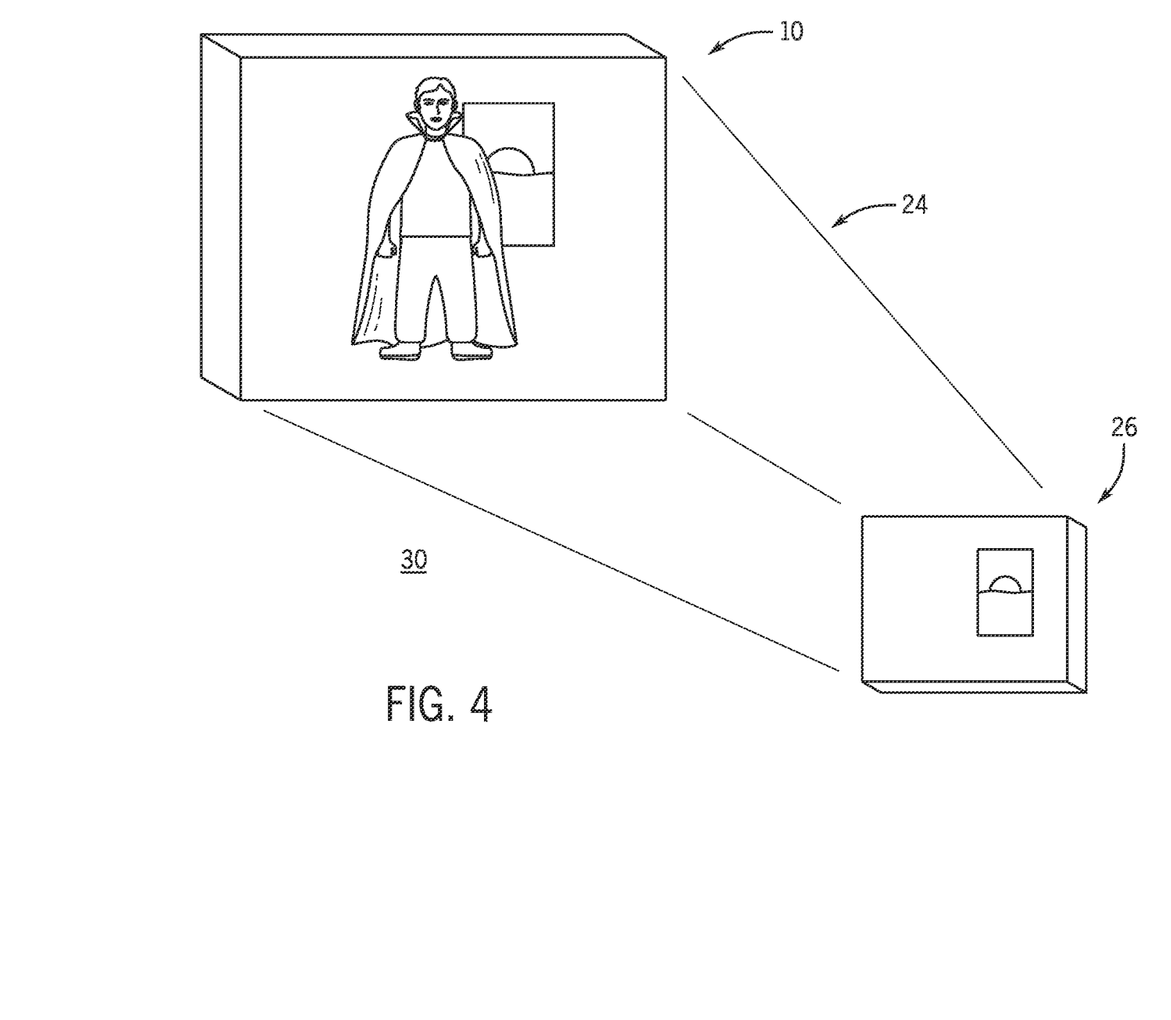
FIG. 4 is a schematic diagram of an effect generated by a light field display system, in accordance with an embodiment of the present disclosure.

As described in greater detail herein, in certain embodiments, primary autostereoscopic images may be displayed via a light field display 10 while the light field display 10 is also generating and projecting light rays 24 that are directed toward one or more display devices 26 to display secondary autostereoscopic images via the one or more display devices 26. As such, the embodiments described herein may enable a variety of different optical effects that might otherwise not be possible. For example, in certain embodiments, autostereoscopic images may be visible when viewing the light field display 10 directly, but not visible when viewed via a reflective device 26. As a non-limiting illustrative example, as illustrated in FIG. 4, there may be a character such as a vampire visible when viewing the light field display 10 directly, but that character may not be seen in the reflective devices 26. In such circumstances, the light rays 24 projected from the light field display 10 may be disabled.

Figure 5:
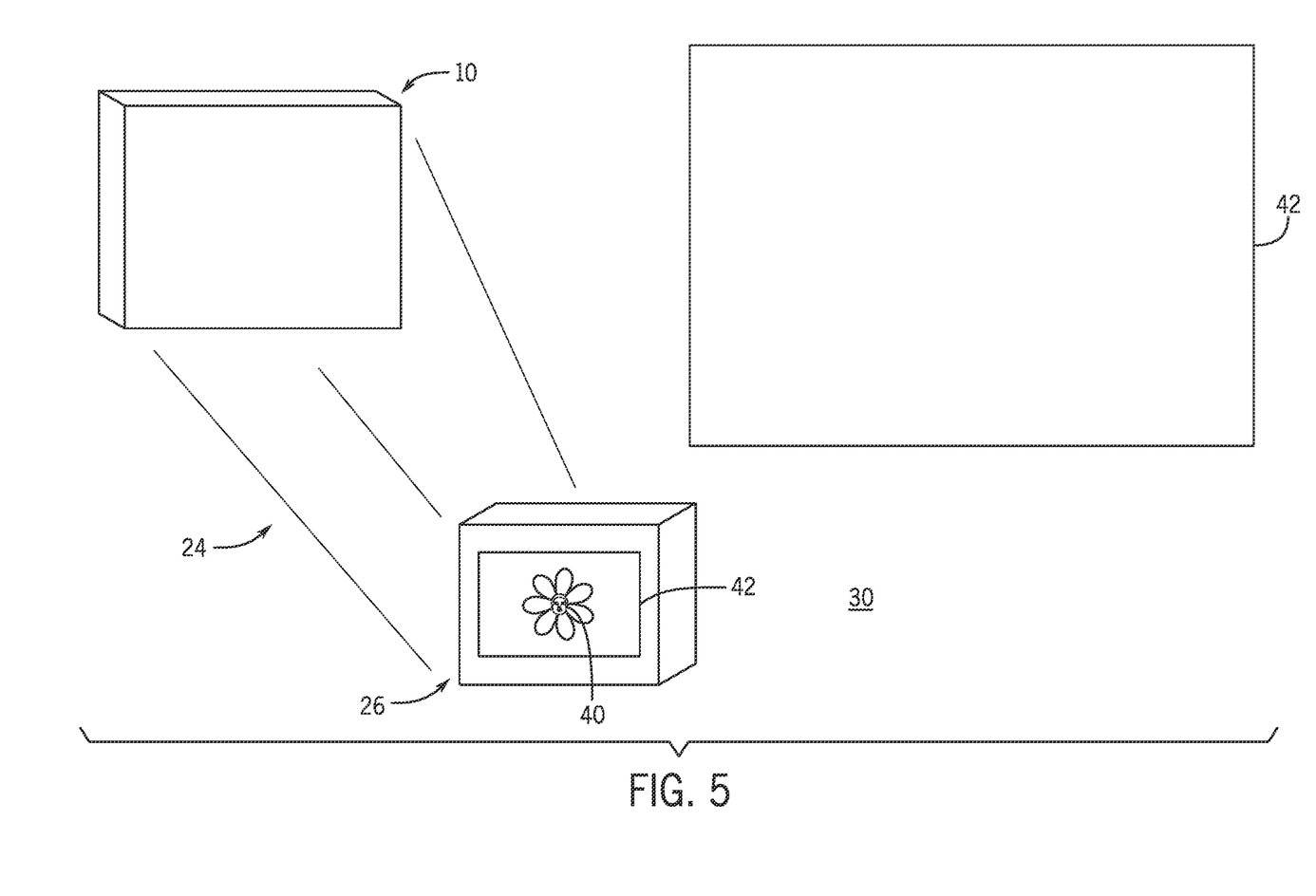
FIG. 5 is a schematic diagram of another effect generated by a light field display system, in accordance with an embodiment of the present disclosure.

In addition, in certain embodiments, autostereoscopic images may be generated in such a way that their reflections in the reflective devices 26 align with physical objects in the physical environment 30. In this way, as illustrated in FIG. 5, the reflective devices 26 may function as a magic filter showing objects that are not physically located in the physical environment 30 when held in proximity to the object in the physical environment 30 (e.g., an x-ray view 40 through a physical wall 42). In such embodiments, a half-mirror (e.g., partially reflective and partially transparent) may be used as the reflective device 26. In other words, in certain embodiments, only part of a reflective device 26 may be reflective, whereas some light may also pass through the reflective device 26.

Figure 6:
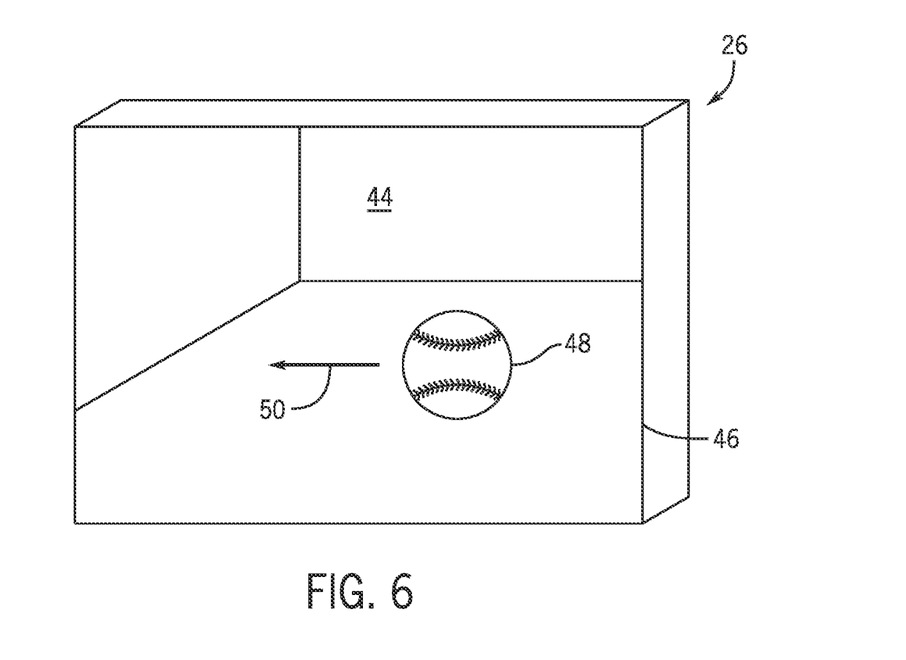
FIG. 6 is a schematic diagram of another effect generated by a light field display system, in accordance with an embodiment of the present disclosure.

In addition, in certain embodiments, autostereoscopic images may be generated in such a way that their reflections in the reflective devices 26 appear to be a physical space that is attached to the reflective device 26. For example, as illustrated in FIG. 6, in certain embodiments, the amusement park guest 38 holding the particular reflective device 26 may perceive the reflection of the light rays 24 projected from the light field display 10 as a three-dimensional space inside of a box 44 on the back side of the reflective device 26 (e.g., which may be of much larger size than the reflective device 26 itself). The amusement park guest 38 holding the particular reflective device 26 may be able to interact with these images using an input device 46 (e.g., a touch screen) on the reflective device 26 (see, e.g., FIG. 2). In addition, in certain embodiments, small digital objects 48 appearing to be in the box on the backside of the reflective device 26 may move around (e.g., as illustrated by arrow 50) based on a physics simulation performed by the control system 16 based on the orientation of the particular reflective device 26, which may be detected by the one or more position/orientation sensors 28 of the reflective device 26, as described in greater detail herein.

In addition, although described primarily herein as displaying primary autostereoscopic images and simultaneously projecting light rays 24 toward reflective devices 26 to display secondary autostereoscopic images via the reflective devices 26, in other embodiments, the light field display 10 may instead display primary non-autostereoscopic images and/or project light rays toward the reflective devices 26 to display secondary non-autostereoscopic images via the reflective devices 26. For example, in such embodiments, the light field display 10 may still be capable of displaying different images in different directions than the reflective devices 26, but the angular density of those images could be lower than needed for autostereoscopic images, as described in greater detail herein.

Figure 7:
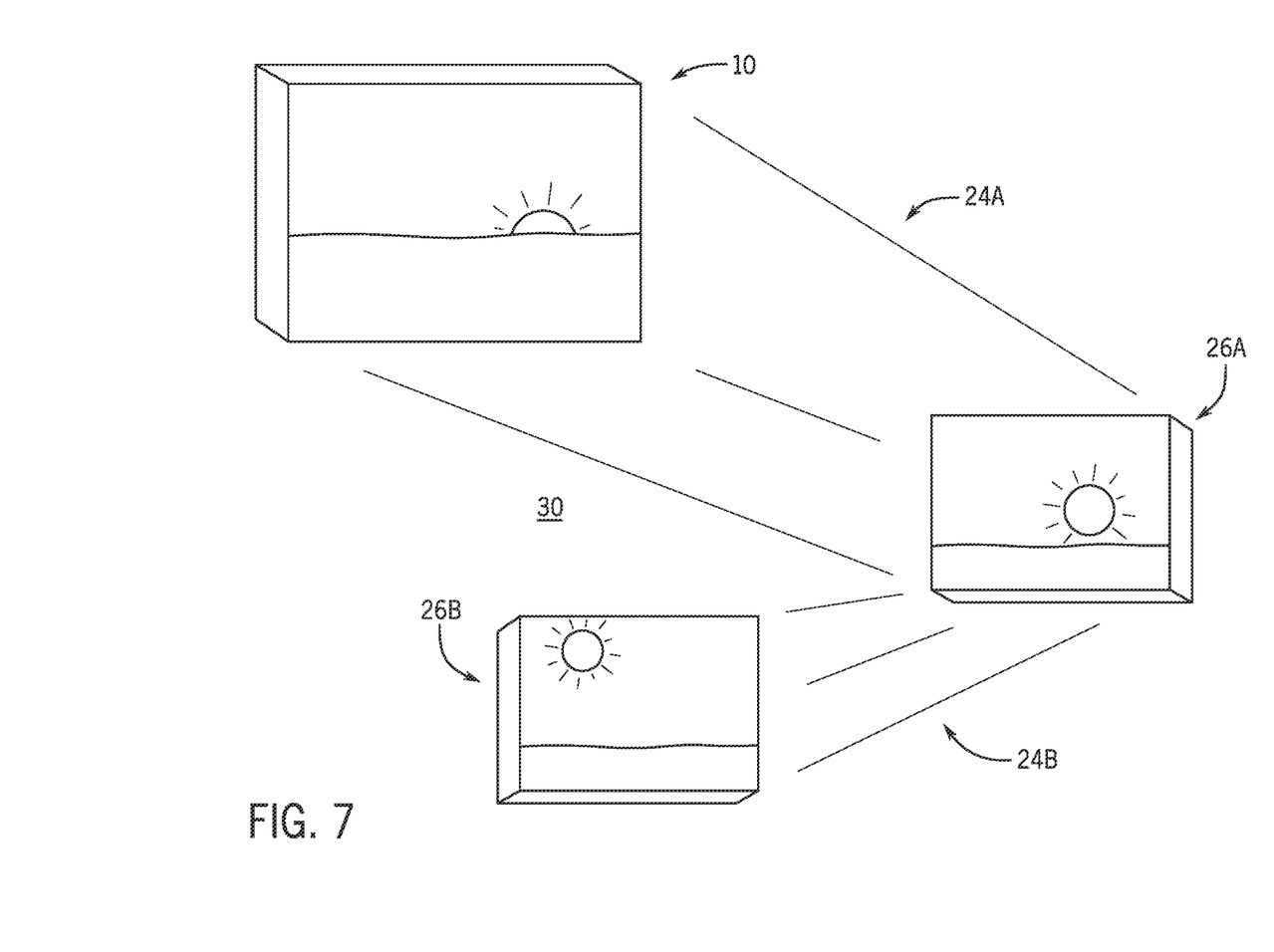
FIG. 7 is a schematic diagram of another effect generated by a light field display system, in accordance with an embodiment of the present disclosure.

In addition, in certain embodiments, the control system 16 may calculate the light field vector function described herein such that the light rays 24A, 24B are reflected off of multiple reflective devices 26A, 26B in a particular sequence. In this way, the effect may still work when an amusement park guest 38 views a reflection of a reflection. FIG. 7 illustrates how each reflection on the various reflective devices 26A, 26B may vary.

Returning now to FIG. 3, it will be appreciated that occlusions between the light field display 10 and the display devices 26 described herein may happen as the amusement park guests 38 move their respective display devices 26 around the physical environment 30, as well as when the other amusement park guests 38 move around the physical environment 30 themselves. When the light rays 24 being projected to the display devices 26 are interrupted (e.g., physically blocked) by amusement park guests 38 and/or other display devices 26 from reaching their intended display devices 26, the immersion of the experience may be broken and/or the amusement park guests 38 may become frustrated since they no longer see a stereoscopic image via their respective display devices 26.

In certain embodiments, the control system 16 may predict when an occlusion is about to happen based on the detected position, orientation, and/or movement of the reflective devices 26 and/or of the amusement park guests holding the display devices 26. In certain embodiments, after a prediction of an upcoming occlusion with respect to a particular display device 26 occurs, and before the occlusion actually happens on the particular display device 26, the control system 16 may cause the light field display 10 to project light rays 24 that display images to the amusement park guest 38 holding the particular display device 26 to justify or explain the upcoming occlusion. For example, the images that are displayed may include decorative static (e.g., magic particles, statics, and so forth) that fits with the visual aesthetic of an amusement park attraction that includes the physical environment 30. In other words, the control system 16 may generate a presentation that contextualizes the interruption in a way that is consistent with immersion in the themed environment. As a specific example, when an imminent occlusion is predicted by the control system 16, a character being presented for display may provide some indication that he is about to magically disappear (e.g., in a magic themed scenario) or that technical difficulties are arising (e.g., in a science fiction themed scenario).

In certain embodiments, after a prediction of an upcoming occlusion with respect to a particular display device 26 occurs, and before the occlusion actually happens on the particular display device 26, the control system 16 may cause the light field display 10 to project light rays 24 that display images (e.g., directional arrows, instructional messages, and so forth) to instruct the amusement park guest 38 holding the particular display device 26 as to what direction they will need to move the particular display device 26 to avoid the occlusion. In certain embodiments, a message may be displayed on some other display device attached to the particular display device 26 after the occlusion occurs. For example, in certain embodiments, a liquid crystal display (LCD) may be placed behind a particular (e.g., partially transparent) display device 26, and may only be turned on (e.g., based on a control signal received from the control system 16) when an occlusion occurs, for example, to show an arrow pointing in the direction that the particular display device 26 can be moved to undo the occlusion.

Due to relatively limited update rates of the tracking system (e.g., the position/orientation sensors 28 and/or the one or more cameras 36) and the light field display 10 described herein, if the display device 26 or the amusement park guest 38 holding the display device 26 move relatively quickly, the images may stop appearing in the display device 26 since the display device 26 has left the area to which images are being projected. In certain embodiments, to help avoid or at least mitigate this issue, the light field display 10 may project the light rays 24 to a wider area than the display device 26 actually takes up. This solution may give some extra space for the display device 26 to move before the update needs to occur.

In addition, in general, the position, orientation, and/or movement of the display device 26 generally needs to be tracked in substantially real time so that the correct images may be directed toward the display device 26 by the light field display 10. Generally speaking, an ideal tracking solution has a minimum number of extra components (e.g., in addition to the light field display 10 and the display device 26). In particular, while there are many possible solutions for tracking the position, orientation, and/or movement of an object in substantially real time, many of these solutions require extra components (e.g., markers, position/orientation sensors, and so forth) to be directly attached to the tracked object. These extra components are generally undesirable since they increase the size, cost, and complexity of the system. In addition, certain optical solutions struggle to track reflective surfaces such as mirrors.

Figure 8:
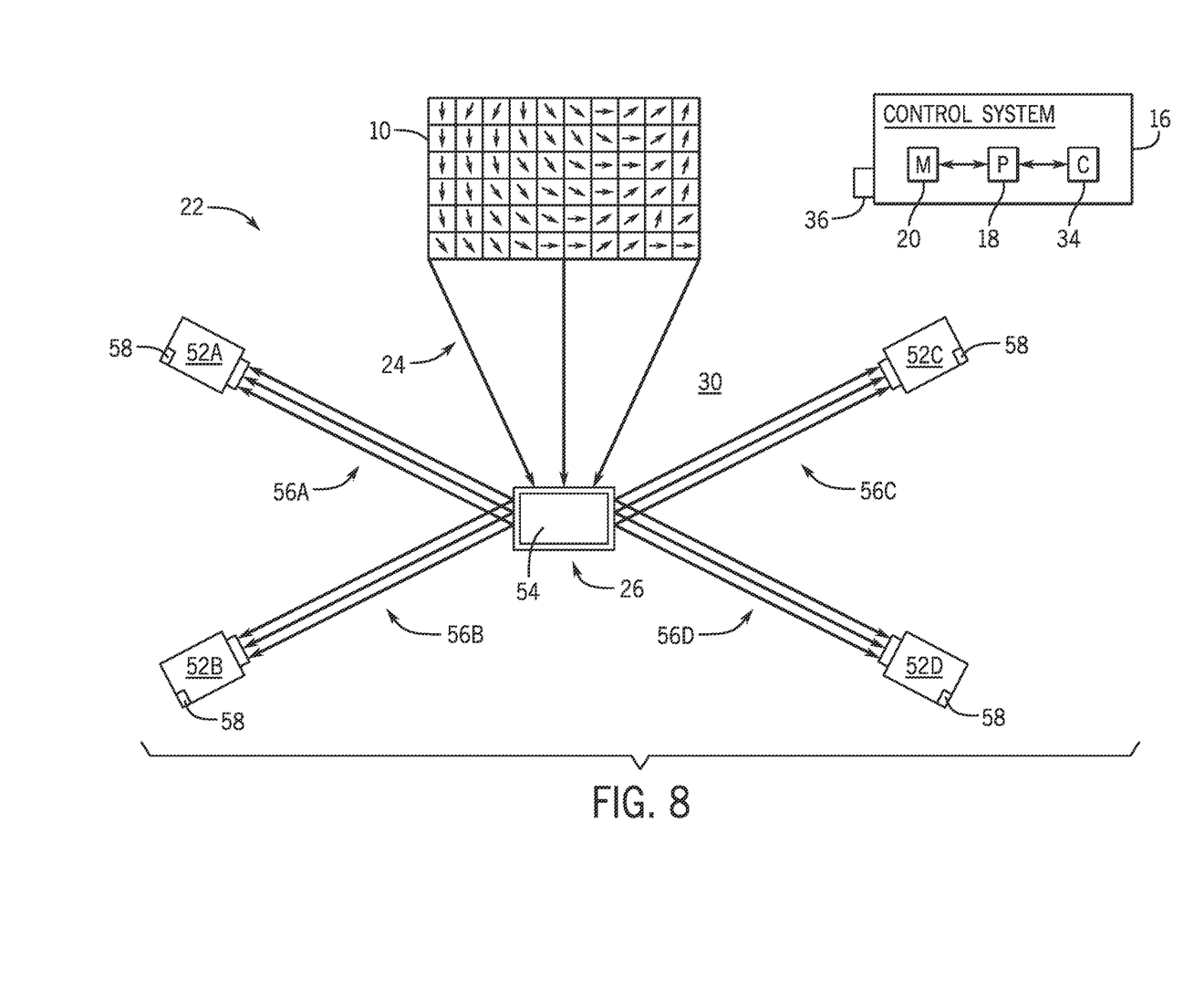
FIG. 8 illustrates a reflective light field display system in which the light field display of FIG. 1 projects light rays to a reflective device located in a physical environment having one or more cameras disposed therein, in accordance with an embodiment of the present disclosure.

The embodiments described herein take advantage of the light field display 10 and the mirrored nature of the display devices 26 described herein to reduce the cost and complexity of the tracking system. In particular, in certain embodiments, one or more cameras may be positioned in the space at fixed and known locations. FIG. 8 illustrates a reflective light field display system 22 in which the light field display 10 of FIG. 1 projects light rays 24 to a reflective device 26 located in a physical environment 30 having one or more cameras 52 disposed therein. As illustrated in FIG. 8, some of the light rays 24 projected from the light field display 10 will bounce off a mirror 54 (e.g., a main, or primary, reflective surface) of the display device 26 as reflected light rays 56, which are then received by the one or more cameras 52. In particular, as illustrated in FIG. 8, in certain embodiments, the light rays 24 that are projected from the light field display 10 may reflect off the mirror 54 of the display device 26 in a plurality of directions toward a plurality of cameras 52A, 52B, 52C, 52D as respective reflected light rays 56A, 56B, 56C, 56D. Although illustrated in FIG. 8 as including four cameras 52A, 52B, 52C, 52D disposed in the physical environment 30, it will be appreciated that any number of cameras 52 may be used in a particular physical environment 30. Each camera 52 may communicate data relating to their respective received light rays 56, which are which are reflected off the mirror 54 of the display device 26, to the control system 16. To enable this communication with the control system 16, each camera 52 may include communication circuitry 58 included therein.

The control system 16 may then identify the received light rays 56 for each respective camera 52 by way of color, brightness, time sequence, or special patterns included in the data received from the respective camera 52. In particular, for each set of received data, the control system 16 may calculate the intersection of a light ray 24 projected from the light field display 10 (e.g., as generated based on control signals generated by the control system 16) and a light ray 56 received by the respective camera 52 (e.g., as reflected off the mirror 54 of the display device 26). As will be appreciated, the intersection point between the light ray 24 projected from the light field display 10 and the light ray 56 received by the respective camera 52 rests on the surface of the mirror 54 of the display device 26. By performing this calculation for at least three points, the surface of the mirror 54 of the display device 26 may be determined by the control system 16 in the three-dimensional space of the physical environment 30. In certain embodiments, to identify the edges of the mirror 54 of the display device 26, many more intersection points may be calculated by the control system 16 to "fill in" the area of the mirror 54 of the display device 26. By calculating the plane of the mirror 54 of the display device 26, the position, orientation, and/or movement of each of the mirror 54 of the display device 26 may be calculated by the control system 16.

Figure 9:
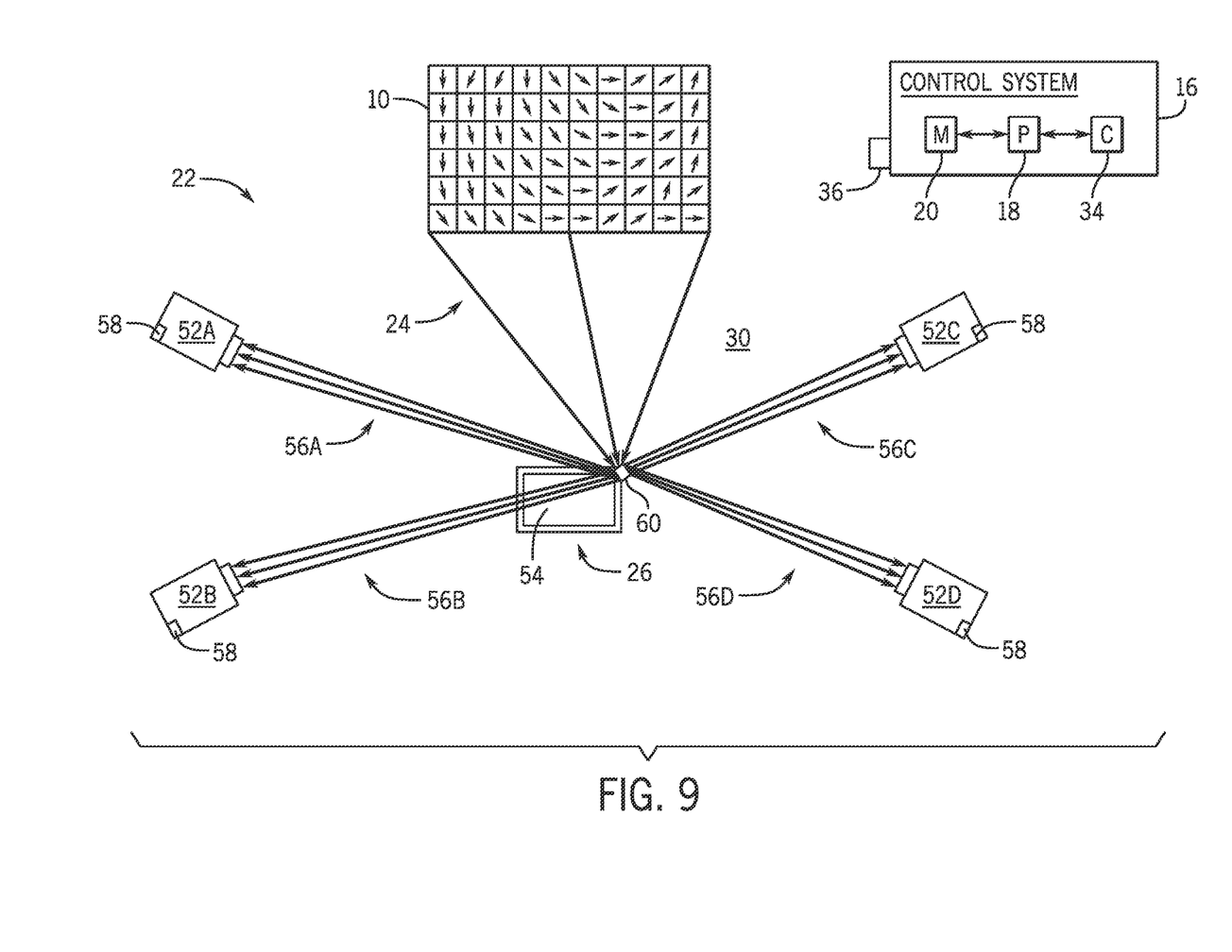
FIG. 9 illustrates a reflective light field display system in which the light field display of FIG. 1 projects light rays to a reflective device located in a physical environment having one or more cameras disposed therein, wherein the reflective device includes an additional mirror rigidly attached to the display device, in accordance with an embodiment of the present disclosure.
Figure 10:
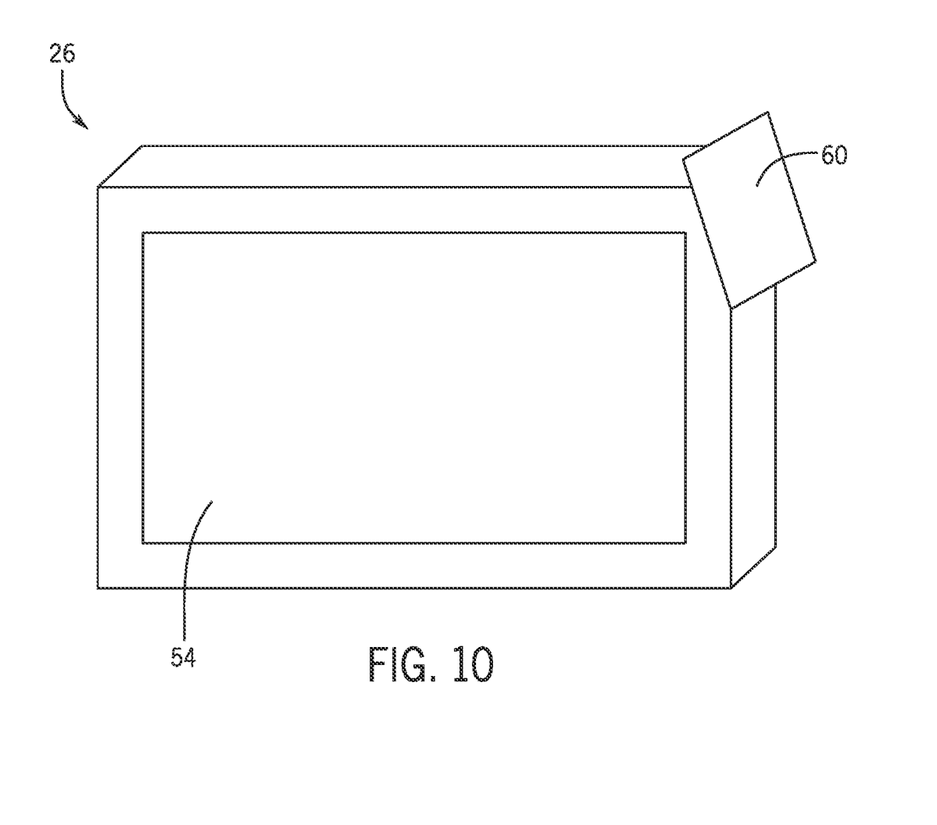
FIG. 10 is a perspective view of the display device of FIG. 9, in accordance with an embodiment of the present disclosure.

In an alternative embodiment, one or more additional mirrors may be rigidly attached to the main mirror 54 of the display device 26. FIG. 9 illustrates a reflective light field display system 22 in which the light field display 10 of FIG. 1 projects light rays 24 to a reflective device 26 located in a physical environment 30 having one or more cameras 52 disposed therein, wherein the reflective device 26 includes one or more additional mirrors 60 (e.g., additional, or secondary, reflective surfaces) rigidly attached to the display device 26. FIG. 10 is a perspective view of the display device 26 of FIG. 9. As illustrated in FIG. 10, in certain embodiments, each additional mirror 60 rigidly attached to the display device 26 may be angled slightly relative to the main mirror 54 of the display device 26. As illustrated in FIG. 9, similar to the embodiment illustrated in FIG. 8, some of the light rays 24 projected from the light field display 10 will bounce off the additional mirror(s) 60 of the display device 26 as reflected light rays 56, which are then received by the one or more cameras 52.

The control system 16 may then identify the received light rays 56 for each respective camera 52 by way of color, brightness, time sequence, or special patterns included in the data received from the respective camera 52. In particular, for each set of received data, the control system 16 may calculate the intersection of a light ray 24 projected from the light field display 10 (e.g., as generated based on control signals generated by the control system 16) and a light ray 56 received by the respective camera 52 (e.g., as reflected off the additional mirror(s) 60 of the display device 26). As described above, the intersection point between the light ray 24 projected from the light field display 10 and the light ray 56 received by the respective camera 52 rests on the surface of the additional mirror(s) 60 of the display device 26. By performing this calculation for at least three points, the surface(s) of the additional mirror(s) 60 of the display device 26 may be determined by the control system 16 in the three-dimensional space of the physical environment 30. In certain embodiments, to identify the edges of the additional mirror(s) 60 of the display device 26, many more intersection points may be calculated by the control system 16 to "fill in" the area of the additional mirror(s) 60 of the display device 26.

By calculating the plane(s) of each of the additional mirror(s) 60 of the display device 26, the position, orientation, and/or movement of each of the additional mirror(s) 60 may be calculated by the control system 16. Then, using the position, orientation, and/or movement of the additional mirror(s) 60 of the display device 26, the control system 26 may in turn determine the position, orientation, and/or movement of the associated main mirror 54 of the display device 26. Indeed, in certain embodiments, the control system 16 may use the specific arrangement of the mirror planes of the additional mirror(s) 60 to uniquely identify the particular display device 26. For example, in such embodiments, each display device 26 located in the physical environment 30 may have a unique combination of additional mirror(s) 60 and/or a unique combination of positions and orientations of the additional mirror(s) 60 relative to the associated main mirror 54 such that the display device 26 may be uniquely identified by the control system 16 based on identification of the additional mirror(s) 60.

Figure 11:
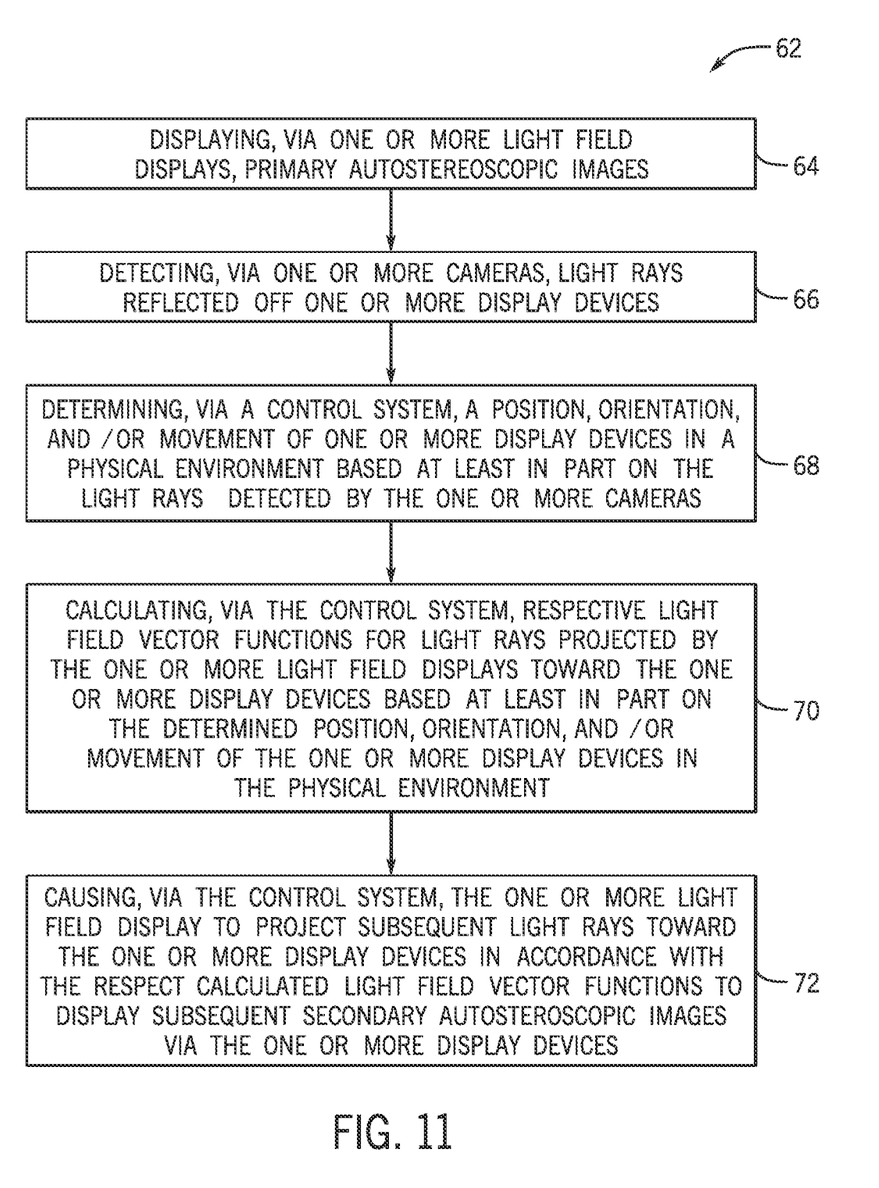
FIG. 11 is a flow diagram of a method for operating a light field display system, in accordance with an embodiment of the present disclosure.

FIG. 11 is a flow diagram of a method 62 for operating the light field display system 22 described herein. As illustrated in FIG. 11, in certain embodiments, the method 62 includes displaying, via one or more light field displays 10, primary autostereoscopic images (block 64). In addition, in certain embodiments, the method 62 includes detecting, via one or more cameras 52, light rays 56 reflected off one or more display devices 26 (block 66). In addition, in certain embodiments, the method 62 includes determining, via a control system 16, a position, orientation, and/or movement of one or more display devices 26 in a physical environment 30 based at least in part on the light rays 56 detected by the one or more cameras 52 (block 68). In addition, in certain embodiments, the method 62 includes calculating, via the control system 16, respective light field vector functions for light rays 24 projected by the one or more light field displays 10 toward the one or more display devices 26 based at least in part on the determined position, orientation, and/or movement of the one or more display devices 26 in the physical environment 30 (block 70). In addition, in certain embodiments, the method 62 includes causing, via the control system 16, the one or more light field displays 10 to project subsequent light rays 24 toward the one or more display devices 26 in accordance with the respective calculated light field vector functions to display subsequent secondary autostereoscopic images via the one or more display devices 26 (block 72).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A light field display system, comprising:
one or more light field displays configured to display primary autostereoscopic images and to project light rays toward one or more display devices to display secondary autostereoscopic images via the one or more display devices;
one or more cameras configured to detect light rays reflected off the one or more display devices; and
a control system configured to:
   determine a position, orientation, and/or movement of the one or more display devices in a physical environment based at least in part on the light rays detected by the one or more cameras;
   calculate respective light field vector functions for the light rays projected by the one or more light field displays toward the one or more display devices based at least in part on the determined position, orientation, and/or movement of the one or more display devices in the physical environment; and
   cause the one or more light field displays to project subsequent light rays toward the one or more display devices in accordance with the respective calculated light field vector functions to display subsequent secondary autostereoscopic images via the one or more display devices.

2. The light field display system of claim 1, wherein the one or more cameras are configured to detect the light rays reflected off respective primary reflective surfaces of the one or more display devices.

3. The light field display system of claim 1, wherein the one or more cameras are configured to detect the light rays reflected off one or more secondary reflective surfaces rigidly attached to the one or more display devices.

4. The light field display system of claim 1, wherein the control system is configured to determine the position, orientation, and/or movement of the one or more display devices in the physical environment by determining intersection points between the light rays projected from the one or more light field displays and the light rays reflected off the one or more display devices.

5. The light field display system of claim 1, wherein the control system is configured to identify the light rays reflected off the one or more display devices based on color, brightness, time sequence, or special patterns in the light rays reflected off the one or more display devices.

6. The light field display system of claim 1, wherein subsequent secondary autostereoscopic images displayed on a display device of the one or more display devices are configured to be visible to eyes of a human associated with the display device, and are configured to appear black from other positions relative to the display device.

7. The light field display system of claim 1, wherein the control system is configured to cause the one or more light field displays to project the subsequent light rays toward the one or more display devices only if one or more humans associated with the one or more display devices meet certain requirements.

8. The light field display system of claim 1, wherein the control system is configured to cause the subsequent secondary autostereoscopic images to be displayed on the one or more display devices aligned with physical objects in the physical environment.

9. The light field display system of claim 1, wherein the subsequent secondary autostereoscopic images displayed on each display device of the one or more display devices appear to be disposed in a physical space attached to the display device.

10. The light field display system of claim 1, wherein the control system is configured to cause the one or more light field displays to project the subsequent light rays toward the one or more display devices in a sequence.

11. The light field display system of claim 1, wherein the control system is configured to:
predict an upcoming occlusion between the one or more light field displays and a display device of the one or more display devices based at least in part on the position, orientation, and/or movement of the one or more display devices in the physical environment, and
adjust the subsequent light rays projected from the one or more light field displays to the display device prior to the occlusion to justify or explain the upcoming occlusion.

12. A method, comprising:
displaying, via one or more light field displays, primary autostereoscopic images;
detecting, via one or more cameras, light rays reflected off one or more display devices;
determining, via a control system, a position, orientation, and/or movement of the one or more display devices in a physical environment based at least in part on the light rays detected by the one or more cameras;
calculating, via the control system, respective light field vector functions for light rays projected by the one or more light field displays toward the one or more display devices based at least in part on the determined position, orientation, and/or movement of the one or more display devices in the physical environment; and
causing, via the control system, the one or more light field displays to project subsequent light rays toward the one or more display devices in accordance with the respective calculated light field vector functions to display subsequent secondary autostereoscopic images via the one or more display devices.

13. The method of claim 12, comprising detecting, via the one or more cameras, the light rays reflected off respective primary reflective surfaces of the one or more display devices.

14. The method of claim 12, comprising detecting, via the one or more cameras, the light rays reflected off one or more secondary reflective surfaces rigidly attached to the one or more display devices.

15. The method of claim 12, wherein determining, via the control system, the position, orientation, and/or movement of the one or more display devices in the physical environment comprises determining intersection points between the light rays projected from the one or more light field displays and the light rays reflected off the one or more display devices.

16. The method of claim 12, comprising identifying, via the control system, the light rays reflected off the one or more display devices based on color, brightness, time sequence, or special patterns in the light rays reflected off the one or more display devices.

17. The method of claim 12, comprising causing, via the control system, the one or more light field displays to project the subsequent light rays toward the one or more display devices only if one or more humans associated with the one or more display devices meet certain requirements.

18. The method of claim 12, comprising causing, via the control system, the one or more light field displays to project the subsequent light rays toward the one or more display devices in a sequence.

19. The method of claim 12, comprising:
predicting, via the control system, an upcoming occlusion between the one or more light field displays and a display device of the one or more display devices based at least in part on the position, orientation, and/or movement of the one or more display devices in the physical environment, and
adjusting, via the control system, the subsequent light rays projected from the one or more light field displays to the display device prior to the occlusion to justify or explain the upcoming occlusion.

20. A light field display system, comprising:
one or more light field displays configured to display primary autostereoscopic images and to project light rays toward one or more display devices to display secondary autostereoscopic images via the one or more display devices; and
a control system configured to:
determine a position, orientation, and/or movement of the one or more display devices in a physical environment based at least in part on light rays reflected off the one or more display devices;
calculate respective light field vector functions for light rays projected by the one or more light field displays toward the one or more display devices based at least in part on the determined position, orientation, and/or movement of the one or more display devices in the physical environment; and
cause the one or more light field displays to project subsequent light rays toward the one or more display devices in accordance with the respective calculated light field vector functions to display subsequent secondary autostereoscopic images via the one or more display devices.

* * * * *